United States Patent [19]
Tokunaga

[11] Patent Number: 5,311,243
[45] Date of Patent: May 10, 1994

[54] FLASH PHOTOGRAPHING SYSTEM

[75] Inventor: Tatsuyuki Tokunaga, Kanagawa, Japan

[73] Assignee: Canon Kabushiki Kaisha, Tokyo, Japan

[21] Appl. No.: 959,176

[22] Filed: Oct. 9, 1992

Related U.S. Application Data

[63] Continuation of Ser. No. 715,916, Jun. 14, 1991, abandoned.

[30] Foreign Application Priority Data

Jun. 19, 1990 [JP] Japan .................................. 2-160378

[51] Int. Cl.$^5$ ........................ G03B 15/03; G03B 7/08; G03B 3/00
[52] U.S. Cl. .................................... 354/413; 354/432; 354/127.1; 354/402; 354/403
[58] Field of Search ............... 354/413, 415, 416, 418, 354/419, 429, 431, 432, 476, 480, 127.1, 145.1, 403, 407, 402

[56] References Cited

U.S. PATENT DOCUMENTS

| | | | |
|---|---|---|---|
| 4,774,401 | 9/1988 | Yamada et al. | 354/432 X |
| 4,974,007 | 11/1990 | Yoshida | 354/402 |
| 5,006,879 | 4/1991 | Takagi et al. | 354/413 |
| 5,164,759 | 11/1992 | Yasukawa | 354/432 X |
| 5,168,299 | 12/1992 | Taniguchi et al. | 354/407 |
| 5,168,366 | 12/1992 | Yasukawa | 354/415 |
| 5,172,157 | 12/1992 | Takagi | 354/415 |

Primary Examiner—Michael L. Gellner
Assistant Examiner—Jae N. Noh
Attorney, Agent, or Firm—Robin, Blecker, Daley & Driscoll

[57] ABSTRACT

In a flash photographing system, measuring light is calculated by dividing a picture plane into a plurality of areas and adjusting a quantity of flash light on the basis of light measurement outputs obtained from the plurality of areas. The light measurement outputs are evaluated and weighted according to focusing states of the areas, and the weighting values are varied according to the kind of automatic focusing mode selected, so that a quantity of flash light can be controlled appositely to the automatic focusing mode selected.

14 Claims, 10 Drawing Sheets

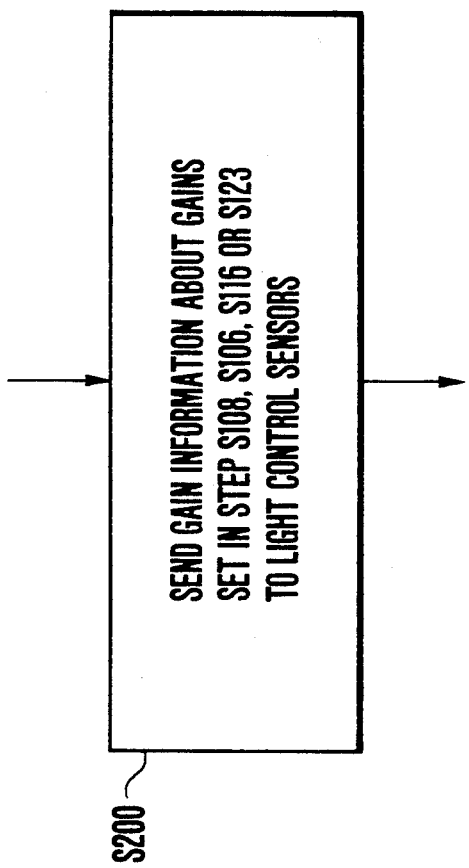

FIG.6(a)

| SELECTION OF AREA TO BE FOCUSED | OPTIONAL SELECTION | AUTOMATIC SELECTION |
|---|---|---|

FIG.6(b)

(DETERMINATION OF NECESSITY OF LENS DRIVING / SELECTION OF REFERENCE AREA FOR LIGHT CONTROL)

| SHOOTING MODE / FOCUS DETECTING STATE | SERVO AF MODE | ONE-SHOT AF MODE | MANUAL FOCUSING MODE |
|---|---|---|---|
| IN FOCUS | STAY / SELECT | STAY / EQUALIZE | STAY / SELECT |
| OUT OF FOCUS | MOVE / SELECT | MOVE / EQUALIZE | STAY / EQUALIZE |
| FOCUS DETECTION IMPOSSIBLE | — / EQUALIZE | — / EQUALIZE | STAY / EQUALIZE |

STAY --- LENS DRIVING --- UNNECESSARY
MOVE --- LENS DRIVING --- NECESSARY

FIG.7

| IN CASE OF REFERENCE AREA EXISTING | REFERENCE AREA --- PROPER EXPOSURE<br>OTHER AREAS ----- OVEREXPOSURE BY GIVEN STEPS |
|---|---|
| IN CASE OF NO REFERENCE AREA | ALL AREAS ------- PROPER EXPOSURE |

FIG.9(a)

LEVELS OF SIGNALS LVL FOR PRODUCING SIGNAL CMP

| I | II | III (PROPER EXPOSURE) | IV | V |
|---|---|---|---|---|
| PD1 (-2) / PD2 (+3) / PD3 (+3) | PD1 (-1) / PD2 (+1.5) / PD3 (+1.5) | PD1 / PD2 / PD3 | PD1 (+1) / PD2 (-1.5) / PD3 (-1.5) | PD1 (+2) / PD2 (-3) / PD3 (-3) |

FIG.9(b)

LEVELS OF SIGNALS LVL FOR PRODUCING SIGNAL CMP

| I | II | III (PROPER EXPOSURE) | IV |
|---|---|---|---|
| PD1 (-2) / PD2 (+8) / PD3 (+8) | PD1 (-1) / PD2 (+4) / PD3 (+4) | PD1 / PD2 / PD3 | PD1 (+1) / PD2 (-4) / PD3 (-4) |

FIG.9(c)

LEVELS OF SIGNALS LVL FOR PRODUCING SIGNAL CMP

| I | II | III (PROPER EXPOSURE) | IV | V |
|---|---|---|---|---|
| PD1 (-2) / PD2 (+1) / PD3 (+1) | PD1 (-1) / PD2 (+1) / PD3 (±0) | PD1 / PD2 / PD3 | PD1 (+1) / PD2 (-1) / PD3 (±0) | PD1 (+2) / PD2 (-1) / PD3 (-1) |

FLASH PHOTOGRAPHING SYSTEM

This is a continuation application under 37 CFR 1.62 of prior application Ser. No. 715,916, filed Jun. 14, 1991 and abandoned Nov. 20, 1992.

BACKGROUND OF THE INVENTION

1. Field of the Invention

This invention relates to a multi-light-control automatic focusing camera of the kind arranged to measure through a plurality of areas the reflection of light projected onto a photographed object from a flash light emitting part and to determine the quantity of flash light to be emitted from the flash light emitting part according to the reflection values thus measured.

2. Description of the Related Art

Many cameras of the light control type arranged to emit flash light from a flash-light emitting part toward a photographed object, to measure light reflected from the object and to determine the quantity of flash light to be emitted on the basis of the intensity (light quantity) of the reflected light, have been placed on the market. In most cases, the cameras of this type perform light control by using a single light measuring sensor with weight attached to the central part of the picture plane in measuring the light. An adequate quantity of exposure light is thus obtainable if the main object to be photographed is located in the central part of the picture plane and in a suitable size on the picture plane. However, in cases where the main object is not in the central part of the picture plane or it is very small as viewed on the picture plane, a proper quantity of exposure light is hardly obtainable because of an adverse effect of the background of the object on the light measuring sensor.

Meanwhile, Japanese Laid-Open Patent Application No. SHO 60-108827 has proposed a multi-light-control type camera which is arranged to divide the picture plane into a plurality of areas and to control the quantity of light to be emitted according to information obtained from a plurality of light measuring sensors. This camera solves the above-stated problem, that is, it increases the probability of obtaining a proper exposure irrespectively of the position and size of the main object.

Further, U.S. patent application Ser. No. 557,172, filed on Jul. 23, 1990, has proposed a camera which is arranged to provide distance measuring means for obtaining information on the measured distances of areas corresponding to a plurality of light measuring areas to evaluate information on the measured light of each of the light measuring areas on the basis of focus information obtained from the distance measuring means and to control the quantity of flash light to be emitted according to the result of the evaluation. That camera is capable of automatically making a proper exposure appositely to a main photographed object irrespectively of the position and the size of the main object obtained within a picture plane. However, the camera has the following shortcoming in the case where framing is changed after a distance ring of a photo-taking lens is driven to adjust the focus of the lens to a desired object through a distance measuring area within the picture plane and the adjusted focus is locked with the object in focus, the main (or desired) object might be brought out of the distance measuring area by the change of framing. Even in such a case, the camera controls the emitting quantity of flash light by evaluating light measurement information obtained mainly from some other object located in the distance measuring area. As a result, the main object which is in focus comes to deviate greatly from a proper exposure.

To solve that problem, it is conceivable to repeat the distance measuring action even after the focus is locked to evaluate the measured light values on the basis of information on the focus obtained for each distance measuring area used at the time of an exposure and to determine the emitting quantity of flash light according to the result of the evaluation. However, it is still difficult to obtain a proper exposure, either because the main object might fail to belong to any of the distance measuring areas or because the control operation of the camera in such a case becomes complex.

SUMMARY OF THE INVENTION

It is an object of this invention to provide a flash photographing system of the kind controlling the quantity of flash light according to the focused states of a plurality of different areas on the basis of the outputs of light control sensors provided respectively for the different areas, wherein the condition for controlling the quantity of flash light is arranged to be variable in accordance with the focusing mode of the camera.

It is another object of the invention to provide a flash photographing system which is arranged under the above-stated object to have the above-stated control condition variable according to whether the focusing mode of the camera is a servo mode or a one-shot mode.

It is a further object of the invention to provide a flash photographing system which is arranged under the above-stated objects to have the above-stated control condition variable according to whether the focusing mode of the camera is an automatic mode or a manual mode.

These and further objects and features of the invention will become apparent from the following detailed description of embodiments thereof taken in conjunction with the accompanying drawings.

BRIEF DESCRIPTION OF THE DRAWINGS

FIGS. 5(a), 5(b) and 5(c) are flow charts showing a series of operations of the same embodiment of the invention.

FIGS. 6(a) and 6(b) show methods for making determination at a step S3 shown in FIG. 5(a).

FIG. 7 shows a method for setting a light control value at a step S9 shown in FIG. 5(a).

FIGS. 9(a), 9(b) and 9(c) show changes brought about in the image-plane light quantity of each of areas by attaching weights to the light control gains in the same embodiment.

DETAILED DESCRIPTION OF THE PREFERRED EMBODIMENTS

Figure 1:
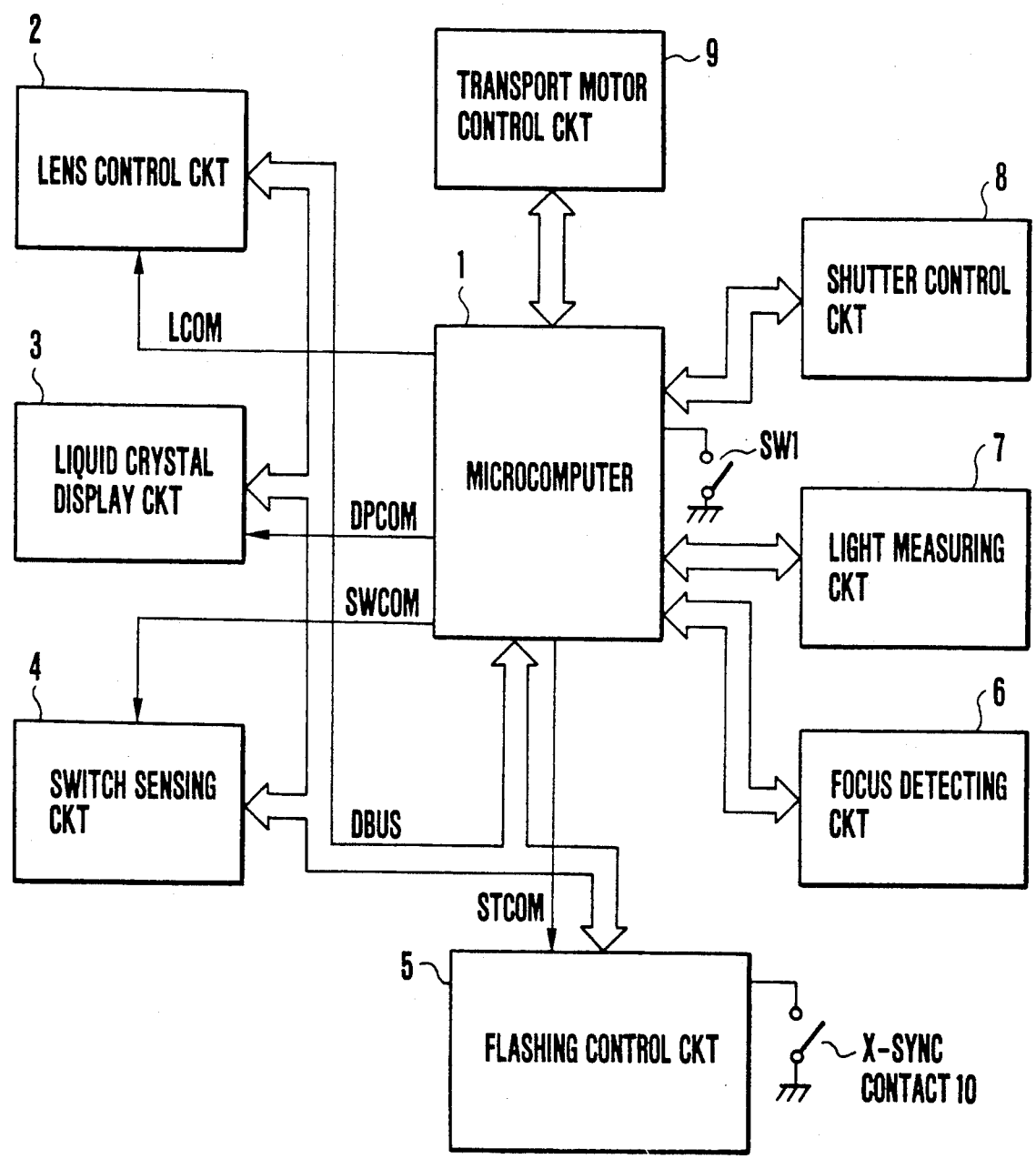
FIG. 1 is a block diagram showing in outline the arrangement of an embodiment of this invention.

FIG. 1 shows in a block diagram a camera which is arranged as an embodiment of this invention. Referring to FIG. 1, a microcomputer 1 is arranged to control the actions of the various parts of the camera. A lens control circuit 2 controls the distance ring and the aperture of a photo-taking lens which is not shown. The lens control circuit 2 is arranged to conduct serial communication with the microcomputer 1 via a data bus DBUS and to control the distance ring and the aperture by controlling motors (not shown) according to the contents of the communication for a period of time during which a signal LCOM is received from the microcomputer 1.

A liquid crystal display circuit 3 is arranged to inform the photographer of photographing information such as a shutter speed, an aperture value, etc., by making a display of it. The display circuit 3 conducts serial communication via the data bus DBUS with the microcomputer 1 and makes a liquid crystal display according to the contents of the communication for a period of time during which a signal DPCOM is received from the microcomputer 1.

A switch sensing circuit 4 is arranged to read the states of switches used by the photographer in setting various photographing conditions and those of switches showing the conditions of the camera and to send data relative to these switches to the microcomputer 1. The circuit 4 sends various switch data thus obtained to the microcomputer 1 by conducting serial communication via the data bus DBUS for a period of time during which a signal SWCOM is received from the microcomputer 1.

A flashing control circuit 5 is arranged to control the flashing action of a flash device and adjusts the quantity of flash light by conducting serial communication via the data bus DBUS with the microcomputer 1 for a period of time during which a signal STCOM is received from the microcomputer 1. The control is performed in accordance with the contents of the communication.

A focus detecting circuit 6 operates under the control of the microcomputer 1. In other words, the microcomputer 1 causes the distance ring of the lens to be driven and determines an in-focus state by driving the focus detecting circuit 6 to find the state of focus.

A light measuring circuit 7 is arranged to measure the luminance of an image field through the lens (TTL) under the control of the microcomputer 1. The light measurement output of the circuit 7 thus obtained is sent to the microcomputer 1 to be A/D (analog-to-digital) converted for use in setting exposure conditions.

A shutter control circuit 8 is arranged to control, according to a control signal from the microcomputer 1, the travels of the leading and trailing shutter curtains which are not shown.

A transport motor control circuit 9 is arranged to control, according to a control signal from the microcomputer 1, a transport motor (not shown) provided for winding and rewinding a film.

An X-sync (synchronizing) contact 10 is arranged to turn on at the timing of completion of running of the shutter leading curtain to inform the flashing control circuit 5 of the timing for causing the flash device to emit flash.

A switch SW1 is interlocked with the shutter release button of the camera. Upon the detection that the switch SW1 has turned on, the microcomputer 1 begins to prepare for an exposure.

Figure 2:
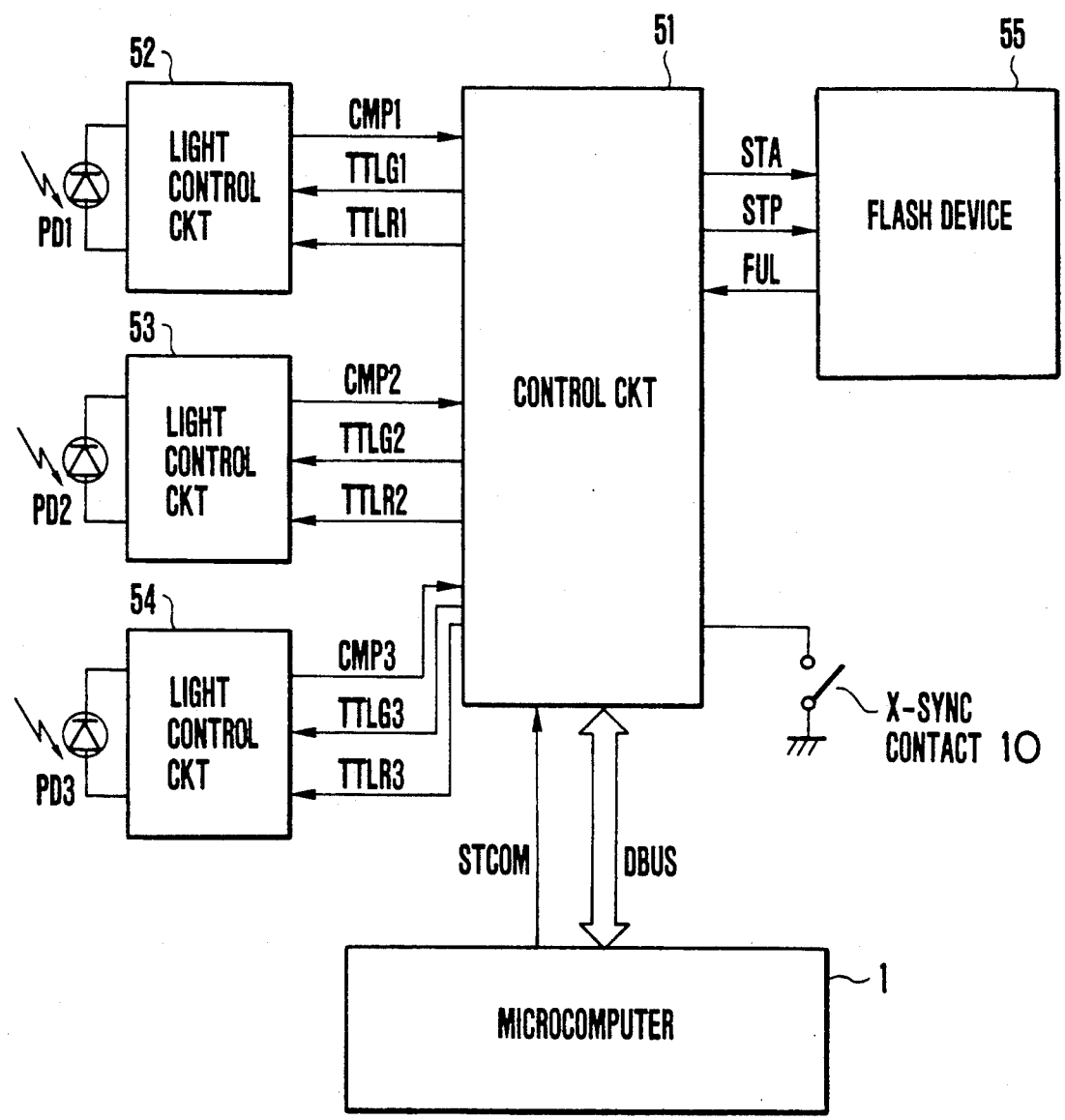
FIG. 2 is a block diagram showing by way of example the arrangement of a flashing control circuit shown in FIG. 1.

FIG. 2 is a block diagram showing by way of example the arrangement of the above-stated flashing control circuit 5. Referring to FIG. 2, a control circuit 51 is arranged to exchange data through serial communication with the microcomputer 1 and to control light control circuits 52, 53 and 54 and a flash device 55.

Each of the light control circuits 52, 53 and 54 consists of a logarithmic compression amplifier, an expansion transistor, an integrating capacitor, etc., and is arranged to begin light control in response to a signal TTLR1, TTLR2 or TTLR3. An incoming image-plane light quantity which is obtained on the surface of film and photo-electrically converted by photo-diode PD1, PD2 or PD3 (hereinafter referred to as light control sensor) is amplified by the logarithmic compression amplifier. Then, a gain is imparted to the amplified incoming signal by the expansion transistor in accordance with the value of a signal TTLG1, TTLG2 or TTLG3. The integrating capacitor then begins to perform an integrating action. When the electric charge of the integrating capacitor comes to exceed a given value, a signal CMP1, CMP2 or CMP3 is supplied from the light control circuit 52, 53 or 54 to the control circuit 51.

The flash device 55 is arranged in a known manner. When an electric charge is sufficiently accumulated at a main capacitor for flashing, the flash device 55 sends a signal FUL to the control circuit 51 to inform the latter of completion of a charging process. With the signal FUL received by the control circuit 51, the control circuit 51 sends a signal STA to the flash device 55. Upon receipt of the signal STA, the flash device 55 begins to emit flash. After that, the flashing action is brought to a stop when a signal STP output from the control circuit 51 is received by the flash device 55.

Figure 3:
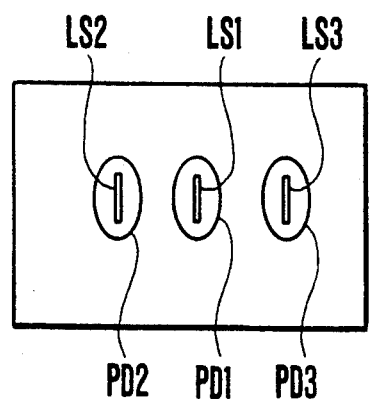
FIG. 3 shows the sensitivity areas of light control sensors and those of line sensors respectively.

FIG. 3 shows the sensitivity areas of the light control sensors PD1 to PD3 and those of focus detecting line sensors which are arranged as described below.

The light control sensors PD1, PD2 and PD3 are arranged to confront the film plane of the camera. They have sensitivity areas on the picture plane as shown in FIG. 3. Meanwhile, the focus detecting line sensors LS1 to LS3 are arranged to have sensitivity areas imparted by an optical system (not shown) for the picture plane in a manner as shown in FIG. 3. These sensitivity areas of the line sensors LS1 to LS3 correspond to the sensitivity areas of the light control sensors PD1 to PD3 respectively.

Figure 4:
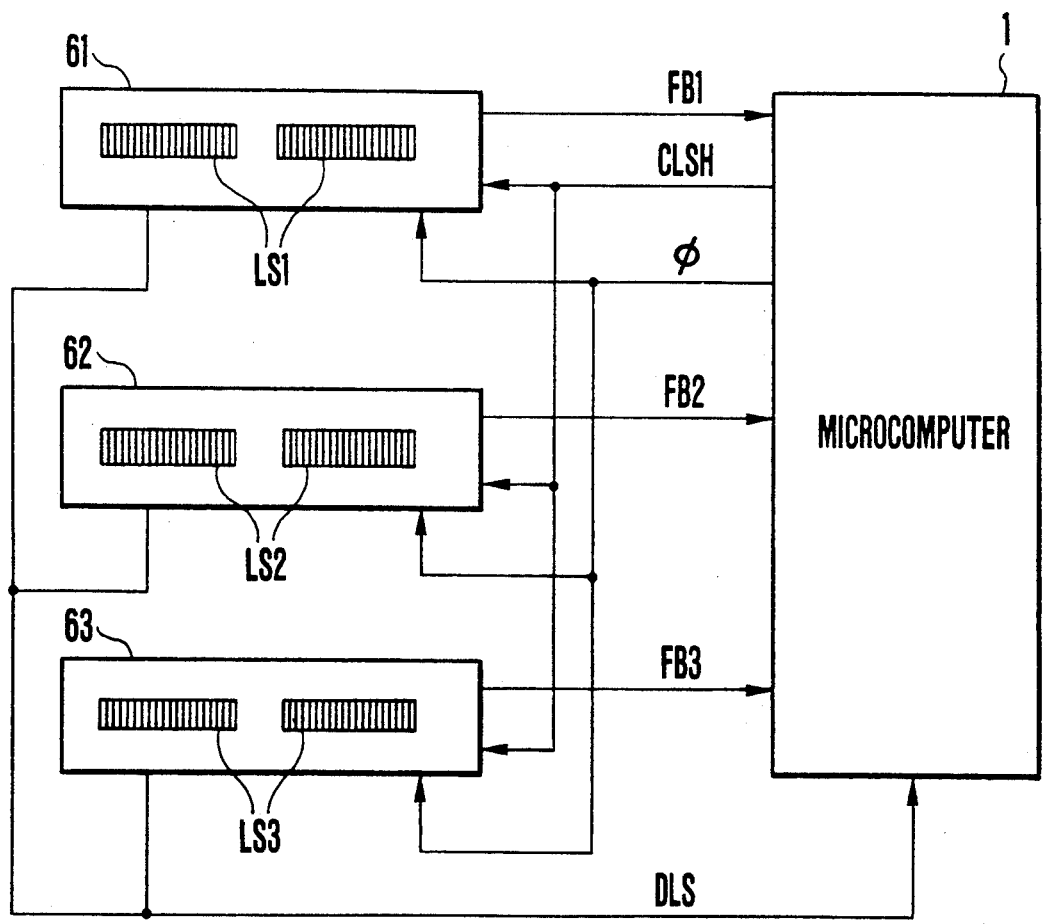
FIG. 4 is a block diagram showing by way of example the arrangement of a focus detecting circuit shown in FIG. 1.

FIG. 4 shows by way of example the arrangement of the focus detecting circuit 6 shown in FIG. 1. The focus detecting circuit 6 is arranged to detect focus in accordance with a known phase-difference detecting method. Referring to FIG. 4, focus detecting parts 61, 62 and 63 are composed of the line sensors LS1, LS2 and LS3 and circuits which are arranged to read out the stored charges made by these sensors LS1, LS2 and LS3 respectively.

With the focus detecting circuit 6 arranged as described above, the line sensors LS1, LS2 and LS3 respectively begin to perform their photo-electric conversion and storage actions in response to a signal CLSH output from the microcomputer 1. When the largest of the electric charges stored at picture elements which form each line sensor reaches a given quantity, the applicable line sensor (unit) produces a signal FB1, FB2 or FB3 and then stops performing its storage action. Each of the focus detecting parts 61, 62 and 63 is arranged to perform this action independently of other focus detecting parts. After its storage action comes to a stop, each sensor samples and holds the stored electric charge. Upon detection of receipt of the signals FB1, FB2 and FB3 from all the focus detecting parts 61, 62 and 63, the microcomputer 1 produces a clock signal $\phi$. Then, in accordance with this clock signal $\phi$, the focus detecting parts 61, 62 and 63 send the sampled-and-held stored electric charges to the microcomputer 1 one after another as a signal DLS. Upon receipt of the signal DLS, the microcomputer 1 A/D-converts it. The microcomputer 1 then computes, on the basis of the A/D-converted value of the signal DLS, a lens driving degree required for bringing the lens to its in-focus position. After completion of the computing operation, the microcomputer 1 conducts serial communication with the lens control circuit 2 on the basis of the result of the computation.

Figure 5A:
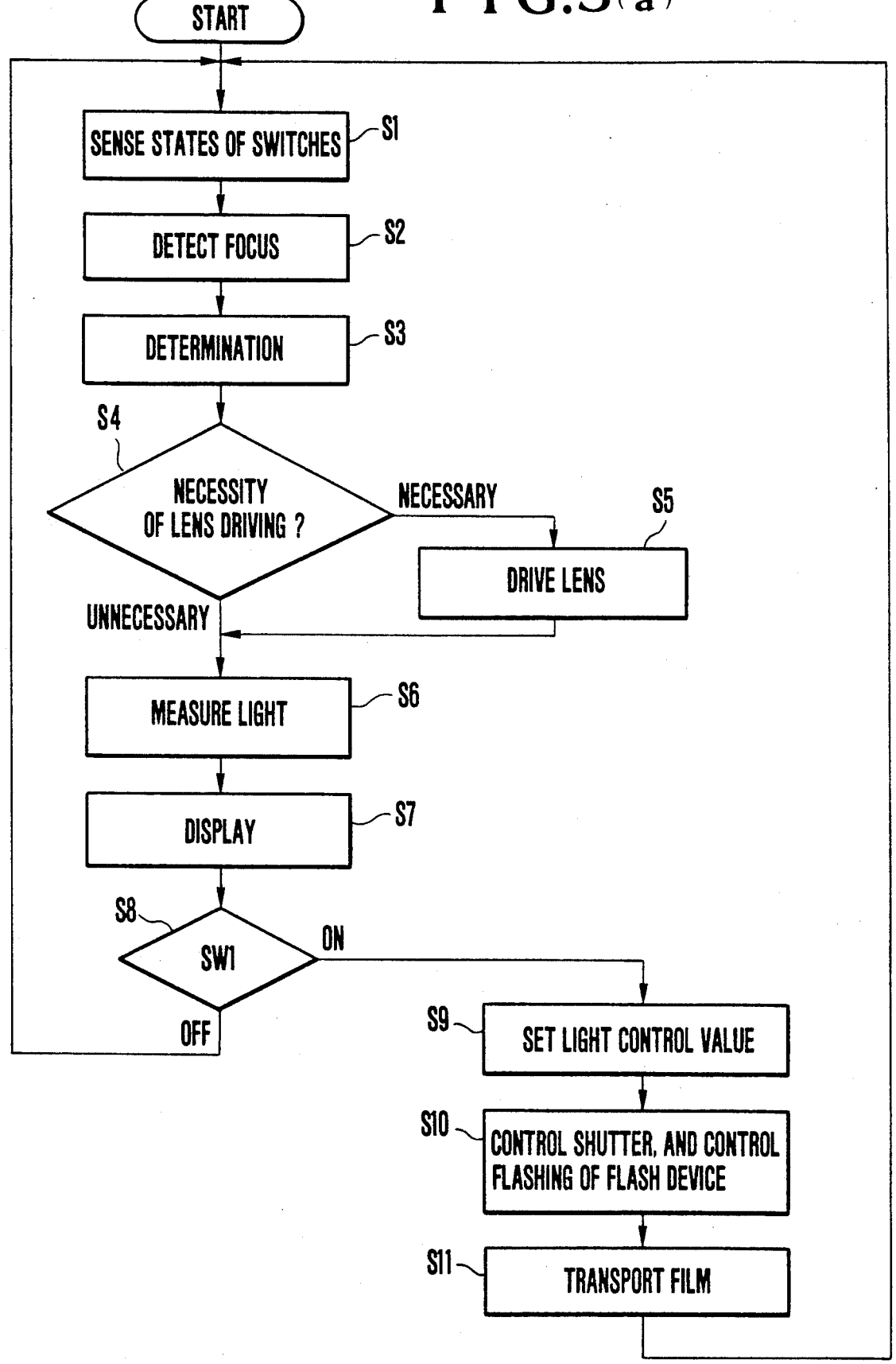

Referring to FIG. 5(a) which is a flow chart, a series of actions of the camera is described below.

Step S1: When the power supply to the camera is turned on, the microcomputer 1 conducts communication with the switch sensing circuit 4 to read the positions of the photographing condition setting switches.

Step S2: The focus detecting circuit 6 is driven to detect the state of focus (lens driving degree) for each area arranged within the picture plane (obtained through each line sensor).

Step S3: Selection of an area to be focused, determination of the necessity of lens driving, and selection of a reference area for light control are made according to the detected state of focus of each area and the photographing mode, etc., determined by switches, etc.

The method for making the determination at the above-stated step S3 is described in outline with reference to FIGS. 6(a) and 6(b).

Selection of an area to be focused:

In determining on which of the areas of the picture plane the lens is to be focused, the camera is operable either in an optional selection mode in which the selection can be made by the photographer or in an automatic selection mode in which the camera is entrusted with the selection, as shown in FIG. 6(a). In the automatic selection mode, the microcomputer 1 determines on which of the areas the lens is to be focused when the area is judged to be focusable according to the states of focus of the areas obtained by the focus detecting action.

Determination of the necessity of lens driving:

The photographing modes include a servo AF (automatic focusing) mode in which the focus detecting action (lens driving action) is repeated until immediately before a shutter release; a one-shot AF mode in which, once an in-focus state is attained, the position of the distance ring of the lens is kept unvarying and a manual focusing mode in which the distance ring of the lens is not allowed to be automatically driven. In the servo AF mode or in the one-shot AF mode, for example, the lens is determined to be driven ("MOVE") if it is judged to be focusable while it is out of focus, and the lens is determined to be not driven ("STAY") if it is already in focus (see FIG. 6(b)).

Selection of a reference area for light control:

In selecting a reference area to be used for control over the light of the flash device, a focusing area which is selected either under an in-focus condition or under a defocus condition is selected as the reference in the servo AF mode. In the manual focusing mode, one of the areas which is found to be in focus among others by the focus detecting action is selected as the reference area for flash light control. In cases where focus is undetectable in the servo AF mode or where there is no in-focus area in the manual focusing mode, etc., all the areas are equalized in controlling the flash light. Further, in the one-shot AF mode, all the areas are equalized (see FIG. 6(b)).

In a case where the lens driving is determined to be necessary ("MOVE") at the above-stated step S3, the microcomputer 1 comes to a step S4. At steps S4 and S5, microcomputer 1 communicates with the lens control circuit 2 to inform the latter of a selected degree of defocus. Then, the distance ring of the lens is driven to a degree corresponding to the degree of defocus. Step S6: The light measuring circuit 7 is rendered operative to measure the light of each area within the picture plane.

Step S7: A computing operation is performed to determine a shutter speed, an aperture value, etc. Various photographing conditions are displayed by the liquid crystal display circuit 3.

Step S8: A check is made for the state of the switch SW1. If the switch SW1 is not in an on-state at this point of time, the microcomputer 1 comes to the step S1 to repeat the steps S1 to S7. When the switch SW1 is found to be on, the flow of operation proceeds to a next step S9 for a sequence of shutter release processes.

Step S9: On entering into the sequence of shutter release processes, microcomputer 1 communicates with the control circuit 51 to provide the latter with light control data obtained on the basis of information on the ISO film sensitivity value, the state of focus, etc. The control circuit 51 then sends signals TTLG1 to TTLG3 to the light control circuits 52 to 54 to cause them to produce the signals CMP1 to CMP3 either when the reflected light of the flash from the object reaches a quantity of light corresponding to a proper exposure or when the reflected light of the flash from the object reaches a quantity of light corresponding to an overexposure by given steps.

In this instance, the signals TTLG1 to TTLG3 are sent in such a manner that if there is a reference area as shown in FIG. 7, the reference area has a proper exposure while the other areas have an overexposure by given steps. In cases where there is no reference area, all the areas have a proper exposure.

At a next step S10: The microcomputer 1 communicates with the lens control circuit 2 to control the aperture and drives the shutter control circuit 8 to control the shutter. In that instance, when the switch 10 is turned on upon completion of the travel of the leading shutter curtain, the control circuit 51 produces the signal STA. The signal STA causes the flash device 55 to begin to emit flash. At the same time, the control circuit 51 produces the signals TTLR1 to TTLR3 to cause the light control circuits 52 to 54 to begin to integrate measured light. When even any one of the light control circuits 52, 53 and 54 supplies the signal CMP1, CMP2 or CMP3, the control circuit 51 produces the signal STP to bring the flashing action of the flash device 55 to a stop. Step S11: Upon completion of the above-stated exposure action, the microcomputer 1 drives the transport motor control circuit 9 to cause the latter to wind one frame amount of film for a next shot.

Figure 5B:
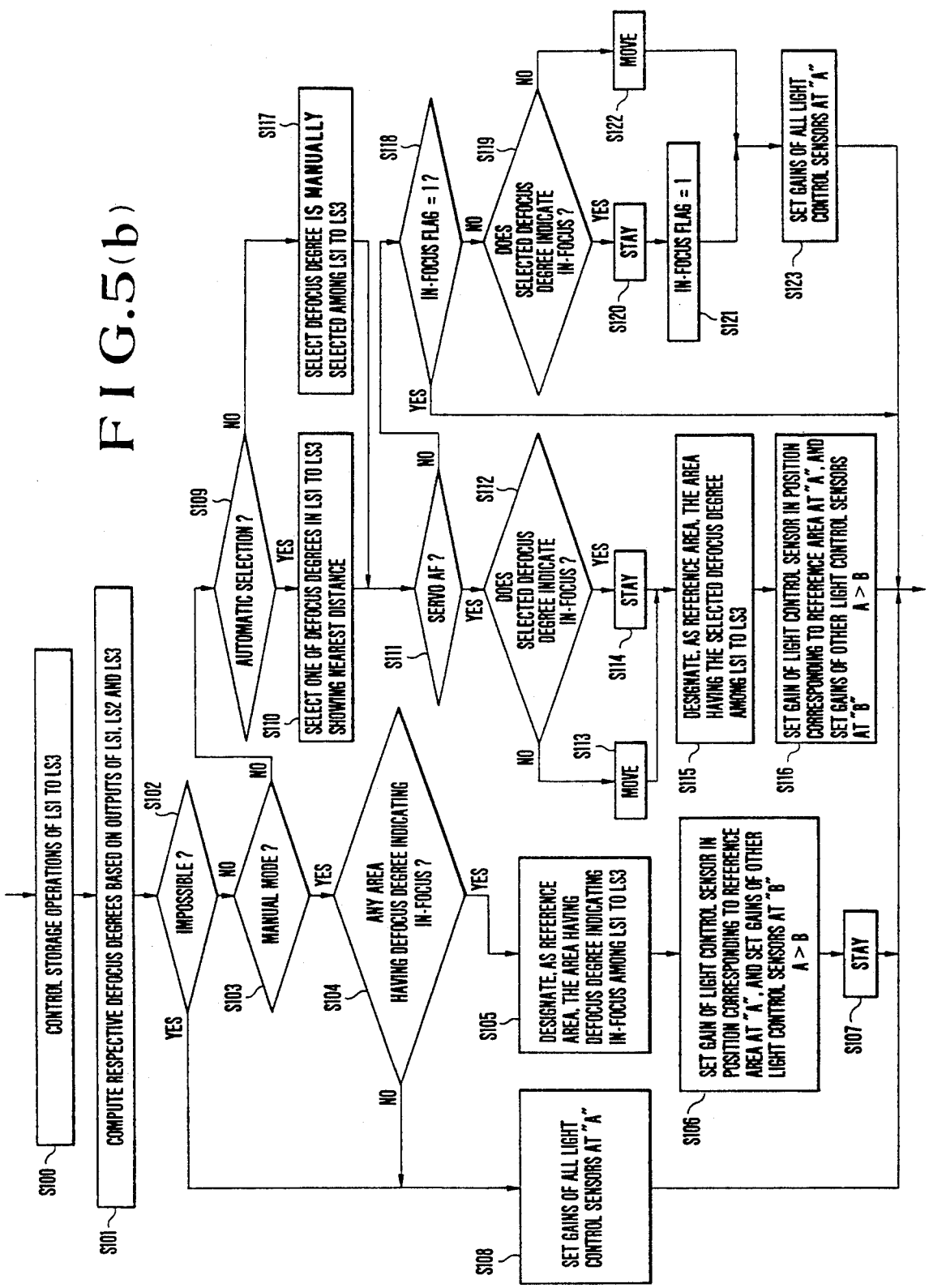

FIG. 5(b) is a flow chart showing the details of the steps S2 and S3 of FIG. 5(a). At a step S100: The microcomputer 1 sends the signal CLSH to the sensors LS1, LS2 and LS3 to cause them to start their charge storing actions. Upon detection of all the signals FB1, FB2 and FB3 which are output from these sensors at the end of their charge storing actions, the microcomputer 1 produces the signal $\phi$ to obtain the stored signals of the sensors LS1, LS2 and LS3 as a signal DLS. Step S101: The degree of defocus of each area is obtained on the basis of the electric charges stored by the sensors LS1, LS2 and LS3. Step S102: A discrimination is made between possibility and impossibility of focus detection on the basis of the electric charge obtained from each area. If the focus detection by all the sensors is determined to be impossible, the flow of operation comes to a step S108. At the step S108: The gains of all the light control sensors PD1, PD2 and PD3 are set at a value A. The gain value A is set for a proper exposure.

If the focus detection is determined to be possible at the step S102, the flow comes to a step S103. At the step S103: A check is made for a manual focusing mode. The camera might have been set in the manual focusing mode with an external operation switch operated and the mode might have been detected at the step S1 of FIG. 5(a). If the manual focusing mode is found to have been set, the flow comes from the step S103 to a step S104. Step S104: A check is made for any one of the areas that has a degree of defocus indicating an in-focus state. If none of the areas indicate an in-focus state, the flow comes to the above-stated step S108. If any one of the areas indicates an in-focus state, the flow proceeds to a step S105. Step S105: The area having a degree of defocus indicating an in-focus state is designated as a reference area. Step S106: The gain of one of the light control sensors PD1 to PD3 which is located in a position corresponding to the designated reference area is set at the above-stated value A. The gains of the other light control sensors are set at a value B. The gain value B is arranged to be smaller than the gain value A and is set for an overexposure which exceeds a proper exposure by a predetermined degree. Step S107: The manual focusing mode is set in the no lens driving mode "STAY".

In the case of the automatic focusing (AF) mode, the flow comes to a step S109. At the step S109: A check is made to find if an automatic selection mode has been set. If so, the flow comes to a step S110. This automatic selection mode, an optional selection mode and a servo AF mode or a one-shot AF mode which will be described later are arranged to be set in the same manner as the manual focusing mode.

At the step S110: With the camera set in the automatic selection mode, a degree of defocus indicating the nearest distance among the degrees of defocus found by the sensors LS1 to LS3 is selected. Step S111: A check is made for the servo AF mode. If the camera is found to be in the servo AF mode, the flow comes to a step S112. At the step S112: A check is made to find if the above-stated selected degree of defocus indicates an in-focus state. If so, the flow comes to a step S114 to set the no-lens-driving mode "STAY". If not, the flow comes to a step S113 to set the lens driving mode "MOVE". Step S115: The sensor area indicating the selected degree of defocus is designated as a reference area. Step S116: The gains of the light control sensors are set in the same manner as at the step S106 described in the foregoing.

In the event of the one-shot AF mode, the flow comes to a step S118. At the step S118: An in-focus flag is checked to find if it is at "1". This flag is set at "0" in the initial stage. It is set at "1" once an infocus state is attained in the one-shot AF mode. When the step S118 is executed for the first time, therefore, the in-focus flag is not at "1" and the flow comes to a step S119. After an in-focus state is attained, steps S119 to S123 are prohibited from being executed.

At the step S119: The selected degree of defocus is checked to find if it indicates an in-focus state like at the step S112. If so, the flow comes to steps S120 and S121. Steps S120 and S121: The lens driving mode is set at the mode "STAY" and the in-focus flag is set at "1". In a case where the selected degree of defocus is found not indicating any in-focus state at the step S119, the flow comes to a step S122. At the step S122: The lens driving mode is set at "MOVE". The flow then proceeds to a step S123. At the step S123: The gains of all the light control sensors are set at the value A.

In the case of the optional selection mode, the photographer is allowed to select any one of the areas of the sensors LS1, LS2 and LS3 by operating a manual operation switch. The following description is on the assumption that a specific area selected by the manual operation switch has already been detected through the step S1 of FIG. 5(a) described in the foregoing. In the optional selection mode, the degree of defocus in the manually selected sensor area is selected at the step S117. With the exception of this, the ensuing steps are executed in the same manner as in the case of the automatic selection mode and, therefore, require no further description.

With the control operation performed in accordance with the flow described above, the determination of the necessity or nonnecessity of lens driving, the selection of the reference area and the gain setting action on the light control value can be carried out as shown in tables in FIGS. 6(a), 6(b) and 7.

Therefore, in a case where the lens driving mode "MOVE" is determined at the step S4 of FIG. 5(a), the lens is driven to a degree corresponding to the selected degree of defocus at the step S5; and, at the step S9, the gain values set in the above-stated manner are given to the light control sensors. The details of the step S9 are as shown at a step S200 in FIG. 5(c).

Accordingly, at the step S10, the flash light emission is controlled as follows. An integrating action of the integrating capacitor of each light control circuit is performed on the output of each sensor obtained from the reflected light resulting from the flash light emission. When the integrated value obtained at any one of the light control circuits reaches a predetermined value, the light control circuit produces its signal CMP1, CMP2 or CMP3 to bring the flashing action to a stop. In this instance, the capacitor of each light control circuit performs an integrating action in accordance with the above-stated value of gain. The output of the sensor having its gain set at the gain value A is controlled in such a way as to become a proper exposure value. The output of the sensor having its gain set at the gain value B, is controlled in such a way as to result in an overexposure exceeding the proper exposure value when the integrated value of its capacitor reaches the predetermined value.

In the case of the embodiment described, if the position and the size of the main object within the picture plane are determinable and there is a reference area, the flashing light quantity of the flash device is arranged to be controlled according to whether the reference area reaches a proper exposure or according to whether the other areas reach an exposure by a predetermined number of steps. Therefore, the embodiment permits taking a picture with an adequate degree of exposure for the main object and without causing other objects to become excessively bright.

Further, in cases where the location and size of the main object are undeterminable and there is no reference area, the flashing light quantity of the flash device is controlled according to whether any one of the areas reaches a proper exposure. Therefore, it is possible to take an adequate picture irrespectively of the location of the main object on the picture plane as long as there is no bright object other than the main object.

Figure 8:
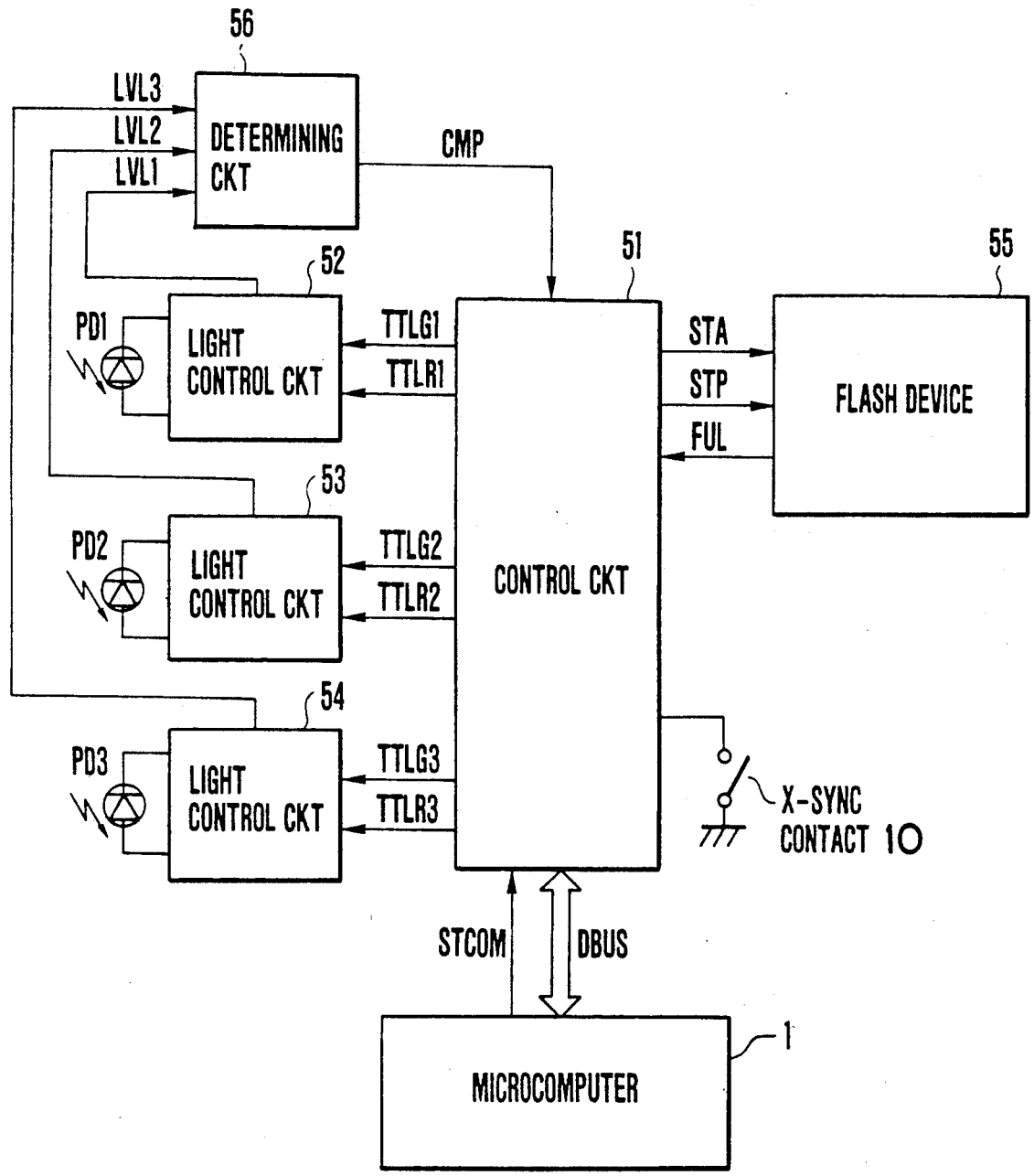
FIG. 8 is a block diagram showing by way of example the arrangement of a flashing control circuit employed in another embodiment of the invention.

FIG. 8 shows in a block diagram a flashing control circuit included in another (second) embodiment of this invention. With the exception of this circuit, all circuits of the camera are identical with the first embodiment shown in FIG. 1.

The flashing control circuit shown in FIG. 8 comprises a control circuit 51, light measuring sensors PD1, PD2 and PD3, light control circuits 52, 53 and 54, a flash device 55, etc., in about the same manner as in the case of the flashing control circuit of the first embodiment shown in FIG. 2. However, in addition to these components, the second embodiment includes a determining circuit 56, which makes this embodiment different from the first embodiment shown in FIG. 2.

Instead of producing the signals CMP1 to CMP3, the light control circuits 52, 53 and 54 are arranged to produce signals LVL1, LVL2 and LVL3 which are obtained by logarithmically compressing the electric charges integrated by capacitors respectively. The determining circuit 56 is arranged to produce a signal CMP and supplies it to the control circuit 51 when the sum of the values of the signals LVL1 to LVL3 comes to exceed a given value.

In the case of the second embodiment, the steps S9 and S10 in the camera control flow of the first embodiment shown in FIG. 5(a) change as follows.

At the step S9: Upon entrance into the shutter release sequence of processes, the control circuit 51 supplies the light control circuits 52 to 54 with the signals TTLG1, TTLG2 and TTLG3 in such a manner that the light control circuits 52, 53 and 54 respectively produce the signals LVL1, LVL2 and LVL3 at X % of their predetermined values when the reflected light of the object resulting from flashing by the flash device reaches a proper exposure value and that the determining circuit 56 produces the signal CMP when the reflected light of the object reaches a proper exposure value at each of the areas.

If there is a reference area, the signals TTLG1, TTLG2 and TTLG3 are sent to the light control circuits 52, 53 and 54 in such a way as to make the value X large for the reference area and small for the other areas. If there is no reference area, the signals TTLG1 to TTLG3 are sent to make the values X of all the areas equal to each other.

At the step S10: When the switch 10 (X-sync contact) turns on after completion of the travel of the leading curtain of the shutter, the control circuit 51 produces the signal STA to cause the flash device 55 to begin its flashing action. At the same time, the control circuit 51 produces signals TTLR1, TTLR2 and TTLR3 to cause the light control circuits 52, 53 and 54 to begin their light measurement integrating actions. When the signal CMP is received, the control circuit 51 produces the signal STP to cause the flash device 55 to stop flashing.

FIGS. 9(a) to 9(c) illustrate further details of the second embodiment. In the case of FIG. 9(a), the value X is set at 60% for the reference area and at 20% for the other areas respectively. As a result of this arrangement, the determining circuit 56 produces the signal CMP under the following conditions.

Condition III: In cases where the exposure is proper for all the areas.

Conditions II and IV: In cases where the exposure is over (or under) by one step for the reference area and is under (or over) by 1.5 steps for the other areas.

Conditions I and V: In cases where the exposure is over (or under) by two steps for the reference area and is under (or over) by three steps for the other areas.

In other words, an exposure which is nearly apposite to the reference area is attainable although it may be somewhat too bright or too dark for the other areas. The exposure thus attained is not excessively deviating from an apposite value for the other areas. Therefore, the arrangement enables the camera operator to take a well balanced picture as a whole.

In the case of FIG. 9(b) the value X is set at 80% for the reference area and at 10% for the other areas to attach a greater weight to the reference area.

In the case of FIG. 9(c), there is no reference area. In this instance, the signal CMP is produced by the determining circuit 56 under the following conditions.

Condition III: In cases where a proper exposure is attainable for all the areas.

Conditions II and IV: In cases where the exposure is under by one step for one area, is over by one step for another area and is proper for the remaining area.

Conditions I and V: In cases where the exposure is over (or under) by two steps for one area and is under (or over) by one step for other areas respectively.

Further, in each of the cases shown in FIGS. 9(a) to 9(c), the level of each of the signals PD1, PD2 and PD3 is set to become "0" when the exposure is under by five steps. In these drawings, parenthesized numerals indicate, in number of steps, the luminance differences in image-plane light quantity of the areas from a proper exposure.

In other words, the arrangement described gives an exposure which does not deviate much from a proper exposure for all the areas, so that pictures can be taken in a well balanced state.

In accordance with the arrangement of this embodiment, information on the measured light of each of the areas is evaluated on the basis of information on the measured distance of the object and the quantity of flash light is controlled in cases where the location and size of the main object are determinable. Therefore, the embodiment enables the photographer to have a proper exposure for a beautiful picture in which the main object and the background are well balanced.

In the photographing mode in which a distance measuring action is first performed by driving the distance ring of the lens to a desired position thereof and by keeping it there and, after the completion of the distance measuring action, a framing action is performed before making an exposure, it has been sometimes impossible with the conventional camera to have an exposure apposite to the main object in cases where the main object comes to belong to none of the areas. Whereas, in accordance with the arrangement of this embodiment, information on focus (measured light information) for the areas is equally evaluated in controlling the quantity of flash light in this photographing mode. Therefore, the embodiment eliminates the possibility that the exposure greatly deviates from an exposure apposite to the main object as a result of lightly treating the main object. A picture thus can be taken with a nearly proper exposure.

In other words, the arrangement according to the invention enables the camera to give proper exposures under any conditions with little probability of failure.

Figure 10A:
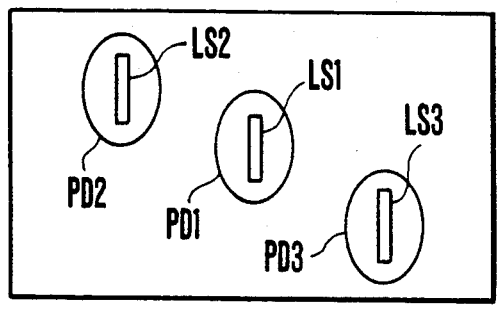
FIGS. 10(a), 10(b) and (10c) show as other examples the arrangement of sensitivity areas of light control sensors and those of line sensors.
Figure 10B:
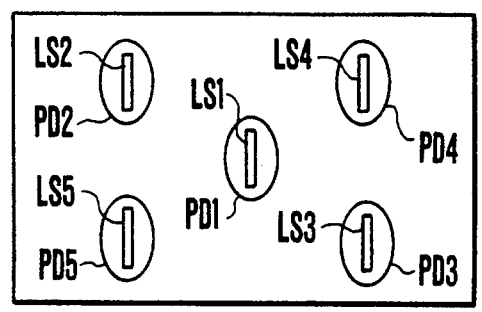
Figure 10C:
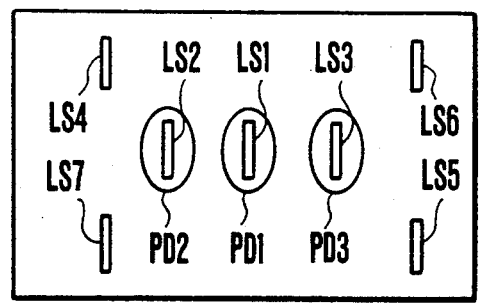

In the case of the embodiment described, the light control sensors and the line sensors are assumed to have their sensitivity areas arranged on the picture plane in a manner as shown in FIG. 3. However, this arrangement may be changed as shown in FIG. 10(a). Further, the number of sensitivity areas on the picture plane may be changed to any greater number, or the number of sensitivity areas on the picture plane of the light control sensors does not have to coincide with that of the line sensors, as shown in FIGS. 10(b) and 10(c).

Further, the means for obtaining information on the measured distance, i.e., the focus detecting circuit, is assumed to operate by a phase difference detecting method. However, in accordance with the invention, this method may be replaced with any other known distance measuring method. In the case of a method of computing an absolute distance, for example, information on the focused state of the object is obtained by considering the lens to be in an in-focus state when the state of the distance ring of the lens coincides with the absolute distance of the object and to be in an out-of-focus state when they do not coincide with each other.

What is claimed is:

1. A flash photographing system for photographing with flash light emitted from a flash device, comprising:
   a) a light measuring circuit arranged to measure light obtained in each of different areas of a scene, said light measuring circuit being arranged to measure, in a flash photography mode, a reflected light obtained from an object to be photographed as a result of flashing by the flash device;
   b) a light quantity control circuit arranged to adjust a quantity of flash light emitted from the flash device on the basis of light measurement outputs of said light measuring circuit obtained by measuring light in each of the different areas;
   c) mode selection means for selecting a first focusing mode or a second focusing mode different from said first focusing mode;
   d) a condition setting circuit operably responsive to said mode selection means and arranged to vary an adjustment condition for adjustment of the quantity of flash light by said light quantity control circuit according to the selected focusing mode; and
   e) a focus detecting circuit arranged to detect a focusing state of each of the different areas and to form focusing state signals which correspond respectively to the different areas;
   wherein said condition setting circuit is arranged to set the adjustment condition at a predetermined condition according to a focusing state of each of the different areas of a scene when the selected focusing mode is said first focusing mode and to set the adjustment condition at a condition different from the predetermined condition when the focusing mode is said second focusing mode.

2. A system according to claim 1, wherein said condition setting circuit is arranged to set different conditions for a light measurement output obtained from an area corresponding to an area showing a predetermined focusing state and for light measurement outputs obtained from other areas when the focusing mode is the first focusing mode, and to set same conditions for light measurement outputs of all the areas when the focusing mode is the second focusing mode.

3. A system according to claim 2, wherein the first focusing mode is a servo mode in which a focusing action is repeated irrespectively of an in-focus state or an out-of-focus state, and wherein the second focusing mode is a one-shot mode in which a focusing state is locked once an in-focus state is attained.

4. A system according to claim 2, wherein the predetermined focusing state is an in-focus state.

5. A flash photographing system for photographing with flash light emitted from a flash device, comprising:
   a) a light measuring circuit arranged to measure light obtained in each of different areas of a scene, said light measuring circuit being arranged to measure, in a flash photography mode, a reflected light obtained from an object to be photographed as a result of flashing by the flash device;
   b) an evaluating condition setting circuit arranged to set an evaluating condition for a light measurement output obtained from each of the different areas;
   c) mode selection means selecting a first focusing mode or a second focusing mode different from said first focusing mode;
   d) a light quantity control circuit arranged to adjust a quantity of flash light emitted from the flash device on the basis of each of the light measurement outputs, said light quantity control circuit being arranged to adjust the quantity of flash light by taking into consideration the evaluating condition determined by said evaluating condition setting circuit for each of the light measurement outputs;
   e) a condition varying circuit arranged to vary the evaluating condition according to the focusing mode; and
   f) a focus detecting circuit arranged to detect a focusing state of each of the different areas and to form focusing state signals which correspond respectively to the different areas,
   wherein said condition varying circuit is arranged to set a predetermined evaluating condition according to a focusing state of each of the different areas of a scene when the selected focusing mode is said first focusing mode, and to set an evaluating condition different from the predetermined evaluating condition when the selected focusing mode is said second focusing mode.

6. A system according to claim 5, wherein said condition varying circuit is arranged to set different evaluating conditions for a light measurement output obtained from an area corresponding to an area showing a predetermined focusing state and for light measurement outputs obtained from other areas when the focusing mode is the first focusing mode, and to set same conditions for light measurement outputs of all the areas when the focusing mode is the second focusing mode.

7. A system according to claim 6, wherein the firs a servo mode in which a focusing action is repeated irrespectively of an in-focus state or an out-of-focus state, and wherein the second focusing mode is a one-shot mode in which a focusing state is locked once an in-focus state is attained.

8. A system according to claim 6, wherein the predetermined focusing state is an in-focus state.

9. A flash photographing system for photographing with flash light emitted from a flash device, comprising:
   a) a light measuring circuit arranged to measure light obtained in each of different areas of a scene, said light measuring circuit being arranged to measure, in a flash photography mode, a reflected light obtained from an object to be photographed as a result of flashing by the flash device;
   b) an integrating circuit arranged to individually integrate light measurement outputs obtained from the different areas and to produce integration signals which correspond respectively to the light measurement outputs;
   c) a stopping circuit arranged to bring emission of flash light by the flash device to a stop when even any one of the integration signals reaches a predetermined value;
   d) a focus detecting circuit arranged to detect a focusing state of each of the different areas and to form focusing state signals which correspond respectively to the different areas; and
   e) an adjustment circuit arranged to individually control integrating actions on the light measurement outputs obtained from the different areas on the basis of the focusing states of the different areas detected by said focus detecting circuit when a focusing mode of a camera is a first mode, and to control the integrating actions irrespectively of the focusing states of the different areas when the focusing mode is a second mode different from the first mode.

10. A system according to claim 9, wherein the first mode is a servo mode in which focus detection and focus adjustment are repeated irrespectively of an in-focus state or an out-of-focus state, and wherein the second mode is a one-shot mode in which a focusing state is locked once an in-focus state is attained.

11. A system according to claim 10, wherein, in the first mode, said adjustment circuit sets a gain of the integrating action on the light measurement output obtained from an area corresponding to one of the different areas showing an in-focus state at a first gain which differs from gains of the integrating actions obtained from other areas, and, in the second mode, said adjustment circuit sets one and the same gain for the integrating actions on the light measurement outputs obtained from all the areas.

12. A system according to claim 11, wherein the first gain is larger than the gains set for the integrating actions on the light measurement outputs obtained from other areas.

13. A flash photographing system for photographing with flash light emitted from a flash device, comprising:
   a) a light measuring circuit arranged to measure light obtained in each of different areas of a scene, said light measuring circuit being arranged to measure, in a flash photography mode, a reflected light obtained from an object to be photographed as a result of flashing by the flash device;
   b) a light quantity control circuit arranged to adjust a quantity of flash light emitted from the flash device on the basis of light measurement outputs of said light measuring circuit obtained by measuring light in each of the different areas;
   c) a condition setting circuit arranged to vary an adjustment condition for adjustment of the quantity of flash light by said light quantity control circuit according to a focusing mode of a camera; and
   d) a focus detecting circuit arranged to detect a focusing state of each of the different areas and to form focusing state signals which correspond respectively to the different areas; wherein said condition setting circuit is arranged to set different adjustment conditions for a light measurement output obtained from an in-focus area among said different areas and for light measurement outputs obtained from other areas when the focusing mode is a first mode and to set the same adjustment condition for light measurement outputs of all areas when the focusing mode is a second mode different from the first mode.

14. A flash photographing system for photographing with flash light emitted from a flash device, comprising:
   a) a light measuring circuit arranged to measure light obtained in each of different areas of a scene, said light measuring circuit being arranged to measure, in a flash photography mode, a reflected light obtained from an object to be photographed as a result of flashing by the flash device;
   b) an evaluating condition setting circuit arranged to set an evaluating condition for a light measurement output obtained from each of the different areas;
   c) mode selection means for selecting a first focusing mode or a second focusing mode different from said first focusing mode;
   d) a light quantity control circuit arranged to adjust a quantity of flash light emitted from the flash device on the basis of each of the light measurement outputs, said light quantity control circuit being arranged to adjust the quantity of flash light by taking into consideration the evaluating condition determined by said evaluating condition setting circuit for each of the light measurement outputs;
   e) a condition varying circuit arranged to vary the evaluating condition according to the focusing mode;
   f) a focus detecting circuit arranged to detect a focusing state of each of the different areas and to form focusing state signals which correspond respectively to the different areas; and
   g) a focus adjustment circuit which selects one of said different areas and adjusts the focus on the basis of a focus signal detected by the focus detecting circuit in said selected area, wherein said condition varying circuit sets the evaluating condition for the outputs in said selected area and the non-selected areas to a predetermined condition when the focusing mode is a first focusing mode and sets the evaluating condition to a condition different from the condition under the first focusing mode when the focusing mode is a second focusing mode.

* * * * *

UNITED STATES PATENT AND TRADEMARK OFFICE
CERTIFICATE OF CORRECTION

PATENT NO. : 5,311,243
DATED : May 10, 1994
INVENTOR(S) : Tatsuyuki Tokunaga

It is certified that error appears in the above-indentified patent and that said Letters Patent is hereby corrected as shown below:

```
Column  1 Line 45 change "irrespectively" to --irrespective--
Column  1 Line 46 change "patent application" to --Patent Applica-
                         tion--
Column  5 Line 58 after "release" insert --,--
Column  6 Line 60 after "emit" insert --a--
Column  6 Line 63 delete "even"
Column  8 Line 13 change "like at the" to --as in--
Column  9 Line 17 change "irrespectively" to --irrespective--
Column 12 Line 67 change "firs" to --first focusing mode is--
```

Signed and Sealed this

Sixth Day of September, 1994

Attest:

BRUCE LEHMAN

Attesting Officer

Commissioner of Patents and Trademarks